July 19, 1966 R. STELLA 3,262,069

FREQUENCY GENERATOR FOR PRODUCING ELECTRIC SIGNALS
OF PREDETERMINED WAVE FORM

Filed July 10, 1963

INVENTOR.
REMO STELLA

BY Hopgood & Calimafde

ATTORNEYS

United States Patent Office 3,262,069
Patented July 19, 1966

1 2

3,262,069

FREQUENCY GENERATOR FOR PRODUCING ELECTRIC SIGNALS OF PREDETERMINED WAVE FORM

Remo Stella, Syosset, N.Y., assignor to Servo Corporation of America, Hicksville, N.Y., a corporation of New York Filed July 10, 1963, Ser. No. 293,977
11 Claims. (Cl. 331—57)

Figures 1, 2, 3:
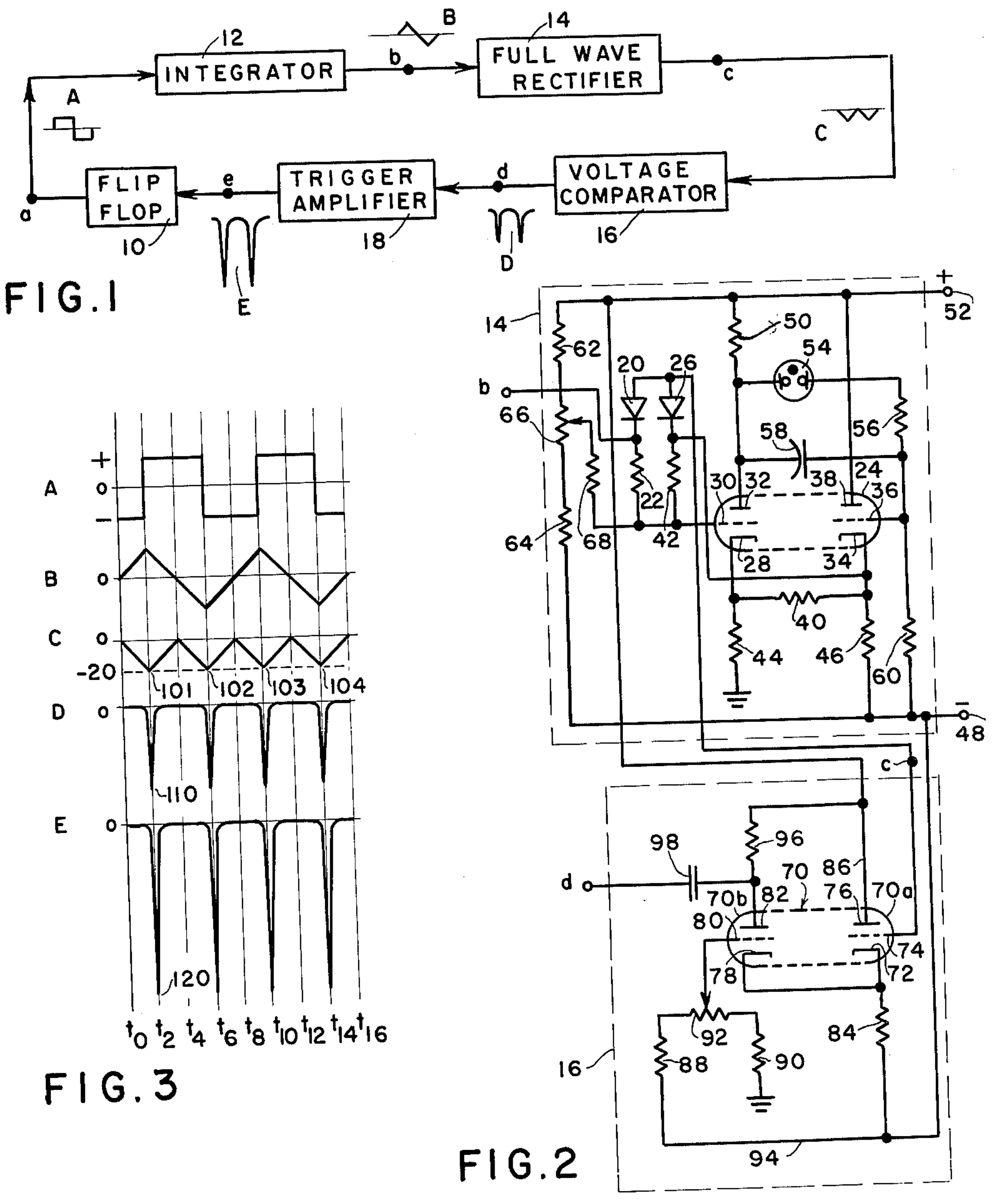

This invention relates to a frequency generator and more particularly to such a generator for producing electric signals of predetermined wave form.

In certain types of electronic devices, such as for example instruments for analyzing and testing servo mechanisms, there exists a need for both a square wave and a triangular wave. One preferred arrangement for generating these waves is by means of a single closed loop oscillating circuit. This loop generally comprises a flip-flop, an integrator, and a voltage comparator circuit connected to one another in the order recited, and a trigger amplifier connected between the voltage comparator and the flip-flop to close the loop. In this loop the square wave is produced at the output of the flip-flop and the triangular wave is derived at the output of the integrator from the square wave which is fed to the input thereof.

The voltage comparator portion of the closed loop includes two separate voltage comparators in the form of two differential amplifiers, one of which is rendered conductive at the positive peaks of the triangular wave, the other being rendered conductive at the negative peaks of the triangular wave. With this arrangement, however, one differential amplifier must be set to conduct at a given triangular wave voltage level of one polarity and the other amplifier must be set to conduct at precisely the same triangular wave voltage level if opposite polarity so that square and triangular waves of precisely the proper shape are produced. This voltage comparator arrangement has the disadvantage of requiring two differential amplifiers. It also has the disadvantage that the amplifier bias settings at which conduction takes place are susceptible to change so that readjustment is necessary before wave forms of the proper shape may again be produced.

Accordingly, it is an object of this invention to provide an improved frequency generator.

It is another object of the invention to provide a frequency generator which employs a single voltage comparator rather than the two required heretofore.

It is a further object of the invention to eliminate the need for the precise bias settings required with the differential amplifiers in prior art closed loop frequency generating circuits.

Still a further object of the invention is to eliminate the necessity for the periodic readjustment of bias required with the differential amplifiers in the prior art circuits referred to above.

All of the objects, features and advantages of this invention and the manner of attaining them will become more apparent and the invention itself will be best understood by reference to the following description of an embodiment of the invention taken in conjunction with the accompanying drawing, in which FIG. 1 is a block diagram illustrating the principles of the invention;

FIG. 2 is a diagrammatic wiring diagram of portions of the block diagram of FIG. 1, and FIG. 3 shows various wave forms existing at different points in the diagrams of FIGS. 1 and 2.

Briefly the invention includes a frequency generator having means for converting a wave of a given frequency to a wave of a higher frequency. A single voltage comparator means is also provided which is normally inoperative and which is rendered operative at predetermined intervals to produce a pulse wave output having a frequency the same as said higher frequency wave. These pulses are then fed to a bistable circuit for causing it to change from one stable state to another to thereby produce a square wave.

Referring now to FIG. 1 there is shown a frequency generator in the form of a closed loop oscillator circuit which includes a bistable circuit such as a flip-flop 10, a signal integrator 12, a full wave rectifier 14, a voltage comparator 16 and a trigger amplifier 18. The wave forms A, B, C, D and E, shown in FIG. 1, are produced at the corresponding points in the circuit indicated by the lower case letters *a, b, c, d* and *e*, and are discussed in detail hereinafter in further connection with FIG. 3.

FIG. 2 shows in schematic wiring diagram form preferred circuits which may be employed to carry out the functions of the full wave rectifier 14 and voltage comparator 16 of FIG. 1. The full wave rectifier 14 comprises a circuit made up of two parallel paths or legs, the first leg including a rectifier diode 20 connected between the input terminal *b* and the rectifier output terminal *c*. The second leg comprises a resistor 22 and a wave inverter circuit including the inverter tube 24, connected in series with a second diode 26 between the terminals *b* and *c*. The inverter tube 24 comprises two triode sections. The first section includes a cathode 28, a control grid 30 and a plate 32, and the second section comprises a cathode 34, a control grid 36 and a plate 38. A positive feedback resistor 40 is connected between the two cathodes 28 and 34, and a negative feedback resistor 42 is connected between the control grid 30 and the cathode 34. A cathode resistor 44 is connected between the cathode 28 and ground and a cathode resistor 46 is connected between the cathode 34 and a negative potential terminal 48. A plate load resistor 50 is connected between the plate 32 and a positive potential terminal 52. The plate 38 is also connected to the positive potential terminal 52. The potential terminals 48 and 52 are connected respectively to the negative and positive potentials of a suitable power supply, not shown, to supply operating potential to the circuit, the chassis ground being connected to a suitable intermediate potential on the power supply. A neon bulb 54 and a resistor 56 are connected in series between the plate 32 and the control grid 36 in parallel with a capacitor 58. A resistor 60 is connected between the control grid 36 and the negative potential terminal 48.

A voltage dividing network comprising fixed resistors 62 and 64 are connected in series with a potentiometer 66 between the positive potential terminal 52 and the negative potential terminal 48. The potentiometer 66 is connected to the control grid 30 through a resistor 68 and serves to control the D.C. operating level of the inverter tube 24, which functions as a D.C. amplifier.

The output at point *c* from the full wave rectifier 14 is fed to the input of the voltage comparator 16. This single voltage comparator 16 may take the form of a differential amplifier including a tube 70 having two triode sections 70*a* and 70*b* as seen in FIG. 2. The first section 70*a* includes a cathode 72, a control grid 74 and a plate 76, and the second section 70*b* comprises a cathode 78, a control grid 80 and a plate 82. The input control grid 74 is connected directly to the output point *c* of the full wave rectifier 14. The cathodes 72 and 78 are connected together and are further connected through a single resistor 84 to the negative potential terminal 48. The plate 76 is connected by means of a wire 86 to the positive potential terminal 52. The control grid 80 of the second triode section 70*b* is connected to a source of negative biasing potential by means of a voltage divider arrangement. This voltage divider includes the fixed resistors 88 and 90 in series with a potentiometer 92, connected between ground and the wire 94 which leads to the negative potential terminal 48. The control grid 80 is connected directly to the arm of the potentiometer 92 which is set to control the operational level of the second triode section **70*b* of the tube 70 as will be further apparent. The plate 82 is connected through a plate load resistor 96 to the positive potential wire 86. The output from the differential amplifier tube 70 is produced at the plate 82 and is coupled through a capacitor 98** to the terminal *d*.

The operation of the circuit of the invention will now be described with the further aid of FIG. 3 which shows the waveforms at designated points and terminals of FIGS. 1 and 2. As mentioned above the closed loop frequency generator of FIG. 1 is an oscillator circuit which produces a square wave A at the output of the flip-flop 10. This square wave is fed to the integrator 12 which produces the basic triangular wave B. This basic triangular wave is then fed to the full wave rectifier 14 to produce the wave C which has a frequency twice that of the basic triangular wave B and which is negative with respect to its own D.C. reference level.

In the full wave rectifier 14 as seen in FIG. 2, the diode 20, the diode 26 and the inverter tube 24, together with their associated components in the rectifier circuit 14, convert the basic triangular wave B to the form of the output wave C. In this rectifier 14, the wave B exists at the input terminal *b* and is fed through a resistor 22 to the input control grid 30 of the inverter tube 24. The inverter tube 24 inverts and amplifies this wave B. The output wave from this tube 24 exists at the cathode 34 and is applied to the rectifier diode 26 connected between the cathode 34 and the point *c*. As already noted, the rectifier diode 20 is connected between the input terminal *b* and the output terminal *c* of the rectifier 14. The diode 26 passes the wave portions or peaks of one polarity and the diode 20 passes the peaks of the opposite polarity. The outputs from these two diodes 20 and 26 are combined to form the output wave C. The frequency of this latter wave C is double that of the input wave B to the rectifier 14. The use of the inverter 24 makes it possible to combine both the positive and the negative peaks of the wave B into a wave wherein all of these peaks are positive, to produce the double frequency output wave C at the point *c*.

This rectified double frequency triangular wave C is then fed to the voltage comparator 16 to produce the trigger pulse wave D. This trigger wave is fed to the trigger amplifier 18, where the pulses are amplified as seen by the pulse wave E and fed to the flip-flop 10. Each time a pulse of the wave E is applied to the flip-flop 10 it causes the flip-flop to change from one of its bistable states to the other, resulting in the production of the square wave A. It will be seen from FIG. 3 that the frequency of the pulses in the waves D and E is the same as that of the double frequency triangular wave C, and twice the frequency of the square wave A.

Accordingly, it will be appreciated that the voltage comparator 16 is caused to become operative at a rate twice that of the frequency of the basic triangular wave B, i.e., it delivers pulses to the point *d* at the frequency of the rectified double frequency triangular wave C. This is accomplished by arranging the voltage comparator circuit 16 to become operative at the negative apices 101, 102, 103, etc., of the double frequency triangular wave C.

The manner in which this is achieved will be more fully appreciated from a further consideration of the circuit of FIG. 2, in which the first triode section **70*a* of the tube 70 is maintained in a conductive condition at all times during operation. The second triode section 70*b*, however, is maintained in a normally non-conductive condition and is rendered conductive only when the wave C approaches the value of the negative apices 101, 102, 103, etc., which for purposes of explanation we may assume to be −20 volts. The slider arm of the potentiometer 92 should be set so that the control grid 80 of the second triode section 70*b* is biased beyond cutoff so that the voltage comparator 16 is inoperative in the absence of the wave C. Also, the tube 70 should be a type which is capable of producing a sharp change in output current at a given operating level or region of grid bias and the cathode resistor 84 should be chosen so that both triode sections 70*a* and 70*b* are biased to operate in this region when the input to the control grid 74** approaches −20 volts.

Thus, referring again to FIG. 3, it will be seen that at the time $t_0$ the flip-flop 10 is in one of its bistable states, as evidenced by the negative portion of the square wave A from time $t_0$ to $t_2$. From time $t_0$ to $t_2$, however, it will be seen that the wave C has a negative slope, so that the negative value of this wave decreases linarly. As this value changes from zero at the time $t_0$ in the negative direction, the second triode section **70*b* is non-conductive and the first triode section 70*a* is conductive but becoming less conductive. At a time very close to time $t_2$ when the wave C has a value of nearly −20 volts, e.g., 19.9 volts, the plate current of the triode section 70*a* will sharply decrease, causing a sharp drop in the IR potential across the resistor 84. This produces a sharp reduction in the negative bias on the second triode section control grid 80 with a resultant sharp increase in plate current through the resistor 96. This causes a sharp drop in the potential on the plate 82 which is transmitted through the capacitor 98** to the terminal *d* and is seen in FIG. 3 as the trigger signal pulse 110. This pulse 110 is amplified in the trigger amplifier 18 to produce the E pulse 120. This changes the flip-flop 10 to the other of its bistable states at the time $t_2$, resulting in the production of the positive half of the square wave A shown during the time interval $t_2 - t_6$.

Also at the time $t_2$ the slope of the wave C changes so that its voltage decreases between the time interval $t_2$–$t_4$. This causes the operation of the voltage comparator tube 70 to reverse from that described above. Thus, beginning at the time $t_2$ the negative potential on the control grid 74 of the first triode section **70*a* will decrease, causing an increase in plate current which increases the IR potential across the cathode resistor 84. This will effect an increase of the negative bias on the second triode control grid 80. This causes the second triode 70*b* to become nonconductive, and it will remain in this state until a brief interval before the time $t_6$ when the process described above will be repeated to change the flip-flop 10** back to its first bistable state.

It should be observed that in the closed loop circuit described the trigger amplifier 18 is not necessary at all frequencies of operation. Accordingly if operation is not desired in the lower region of the .01 to 1000 c.p.s. range of operation, certain economies of manufacture can be realized by not employing the trigger amplifier 18. Also it will be appreciated that various other modifications in the circuit may be made, as for example substituting other electron flow devices such as transistors for the tubes in the circuit of FIG. 2.

It will be seen that in accordance with the teaching of the invention an improved circuit has been devised for producing a basic triangular wave which is simpler and less expensive than arrangements of the prior art. In such previous arrangements the triangular wave was derived with the aid of a closed loop which employed two differential amplifier voltage comparators, one of which was rendered conductive only at the positive or upper peaks of the basic triangular wave B, the other being rendered conductive at the negative or lower peaks of this wave. As already mentioned, such prior art arrangements are disadvantageous in that each differential amplifier requires an accurate bias voltage setting in order that the basic triangular wave B produced have peaks of the same amplitude on opposite sides of its zero D.C. reference line.

In the preferred embodiment of applicant's invention the voltage comparator includes only one differential amplifier. Accordingly, no such disparity of opposite peak amplitude can result since only one reference voltage point on the wave C is employed to drive the voltage comparator, rather than the upper and lower voltage reference points for driving separate voltage comparators as in the prior art. Additionally, since there is only one voltage comparator, it will be apparent that there is less need for adjustment and less maintenance required. Also, the circuit of the invention is less expensive for the particular application for which it was devised, since only one voltage comparator is now needed; the full wave rectifier 14 which is not required in the prior art arrangement is already available to serve other functions in the equipment in which this invention is employed.

It will be appreciated that although the invention has been described with particular reference to a closed loop system that the principles taught herein can also be applied to other systems.

While the foregoing description sets forth the principles of the invention in connection with specific apparatus, it is to be understood that the description is made only by way of example and not at a limitation of the scope of the invention as set forth in the objects thereof and in the accompanying claims.

What is claimed is:

1. A circuit arrangement for triggering a bistable circuit from one state to another comprising means for receiving a first signal wave of a given frequency, means for rectifying said wave to produce a second wave having a frequency twice that of said given frequency, single means for comparing the amplitude of said second wave with a reference potential, said single means having conductive and non-conductive states and an output coupled to said bistable circuit, said single means being normally non-conductive and being rendered conductive in response to said second wave when the amplitude of said second wave bears a predetermined relationship to the amplitude of said reference potential, said single means producing in said output a triggering pulse each time the same is rendered conductive, whereby said bistable circuit is changed from one of its bistable states to the other.

2. The invention described in claim 1 wherein said rectifying means comprises a circuit having two legs in parallel with one another, one of said legs including a diode and the other of said legs including a wave inverter in series with another diode, one end of said two-leg parallel circuit forming a rectifier input conductor which is connected to receive said first signal wave, and the other end of said two-leg parallel circuit forming a rectifier output conductor which is connected to the input of said single means.

3. The invention described in claim 1 wherein said comparison means comprises a single differential amplifier type circuit.

4. A circuit arrangement for triggering a bistable circuit from one state to another comprising a full wave rectifier for receiving a first signal wave of a given frequency and converting it to a second wave having a frequency twice that of said given frequency, a single voltage comparator for receiving said second wave and for comparing the amplitude thereof with a reference potential, said voltage comparator being normally non-conductive and being rendered conductive in response to said second wave for an interval of time during each cycle thereof to produce a triggering signal, and means for coupling said triggering signal to said bistable circuit to cause it to change from one state to another.

5. The invention described in claim 4 wherein said means for coupling said triggering signal to said bistable circuit includes a trigger pulse amplifier.

6. A closed loop frequency generator comprising a bistable circuit for producing a first wave, an integrating circuit coupled to the output of said bistable circuit for producing a second wave, means coupled to the output of said integrating circuit for producing a third wave having a frequency which is a multiple of the frequency of said second wave, a single voltage comparator coupled to the output of said means for developing a trigger pulse during each cycle of said third wave, and means for coupling the trigger pulses to said bistable circuit to cause the same to change from one of its stable states to the other.

7. A closed loop frequency generator comprising a bistable circuit for producing a square wave, an integrator coupled to said bistable circuit for producing a first triangular wave of a given frequency, a full wave rectifier coupled to said integrator for converting said first triangular wave to a second triangular wave having a frequency twice that of said first triangular wave, a single voltage comparator coupled to receive said second triangular wave, said voltage comparator being normally non-conductive and being rendered conductive at a predetermined amplitude of said second triangular wave for an interval of time during each cycle thereof to produce a triggering signal, and means for coupling said triggering signal to said bistable circuit, whereby said bistable circuit is changed from one of its states to another.

8. The invention described in claim 7 wherein said rectifier comprises a circuit having two legs in parallel with one another, one of said legs including a diode and the other of said legs including a wave inverter in series with another diode, one end of said two-leg parallel circircuit forming a rectifier input conductor connected to receive said first triangular wave, and the other end of said two-leg parallel circuit forming a rectifier output conductor connected to the input of said single voltage comparator.

9. The invention described in claim 7 wherein said means for coupling said triggering signal to said bistable circuit includes a trigger pulse amplifier.

10. The invention described in claim 7 wherein said voltage comparator comprises a differential amplifier type circuit.

11. The invention described in claim 10 wherein said differential amplifier comprises a first electron flow device, having an input electrode coupled to receive said second triangular wave from said rectifier, and a second electron flow device having an input electrode coupled to receive the output from said first device, the output from said second device carrying said triggering signal and being coupled to the input of said bistable circuit, and means to bias said second device beyond cutoff so that it conducts only when the amplitude of said second wave reaches a predetermined value.

References Cited by the Examiner

UNITED STATES PATENTS 2,748,272 5/1956 Schrock ---------- 331—144 X

ROY LAKE, *Primary Examiner.*

J. B. MULLINS, *Assistant Examiner.*